(12) United States Patent
Lenz et al.

(10) Patent No.: US 10,589,241 B2
(45) Date of Patent: Mar. 17, 2020

(54) METHOD FOR STORING COOLING AGENTS

(71) Applicant: Symrise AG, Holzminden (DE)

(72) Inventors: Oliver Lenz, Uslar (DE); Michael Michler, Elmen (DE); Jörg Niekerken, Holzminden (DE); Jürgen Siewart, Rollshausen (DE); Christian Wolter, Ottenstein (DE)

(73) Assignee: Symrise AG, Holzminden (DE)

( * ) Notice: Subject to any disclaimer, the term of this patent is extended or adjusted under 35 U.S.C. 154(b) by 298 days.

(21) Appl. No.: 15/519,942

(22) PCT Filed: Feb. 11, 2016

(86) PCT No.: PCT/EP2016/052948
§ 371 (c)(1),
(2) Date: Apr. 18, 2017

(87) PCT Pub. No.: WO2016/131710
PCT Pub. Date: Aug. 25, 2016

(65) Prior Publication Data
US 2017/0368521 A1 Dec. 28, 2017

(30) Foreign Application Priority Data
Feb. 19, 2015 (EP) ..................... 15155764

(51) Int. Cl.
*B01J 2/26* (2006.01)
*B65B 1/04* (2006.01)
*B01J 2/20* (2006.01)

(52) U.S. Cl.
CPC ......... *B01J 2/26* (2013.01); *B65B 1/04* (2013.01); *B01J 2/20* (2013.01)

(58) Field of Classification Search
None
See application file for complete search history.

(56) References Cited

U.S. PATENT DOCUMENTS

| | | | |
|---|---|---|---|
| 3,023,253 A | 2/1962 | Bain et al. | |
| 3,064,311 A | 11/1962 | Bain et al. | |
| 5,663,460 A * | 9/1997 | Yamamoto et al. | ......................... A24B 15/301 568/828 |
| 8,288,593 B2 * | 10/2012 | Rauls et al. | ............... B01J 2/24 568/829 |
| 10,173,953 B2 * | 1/2019 | Roth | ....................... C07C 29/76 |
| 10,328,405 B2 * | 6/2019 | Siewert | .................... C07C 29/78 |
| 2005/0169987 A1 * | 8/2005 | Korber | .................... C07C 29/76 424/464 |
| 2008/0194883 A1 * | 8/2008 | Nowak et al. | ........... A23G 3/36 568/829 |

(Continued)

FOREIGN PATENT DOCUMENTS

WO 2008/152009 A1 12/2008
WO WO-2012065635 A1 * 5/2012 ........... B65D 5/0227

*Primary Examiner* — Stephen F. Gerrity
(74) *Attorney, Agent, or Firm* — Dilworth & Barrese, LLP

(57) ABSTRACT

The invention relates to a method for the storage of cooling agents without caking, characterized in that the latter are filled into standard packages having a maximum capacity of 25 l, with the proviso that (a) the packages are filled to 50% maximum, and (b) the amount filled into the package does not exceed 10 kg.

13 Claims, 4 Drawing Sheets

(56) References Cited

U.S. PATENT DOCUMENTS

2011/0313205 A1* 12/2011 Nagaoka et al. .... B01D 9/0013
568/829
2017/0027205 A1* 2/2017 Brodock et al. ........ A23L 27/79

* cited by examiner

METHOD FOR STORING COOLING AGENTS

FIELD OF THE INVENTION

The invention is located within the field of coolants for cosmetic or else pharmaceutical applications, and relates to a method allowing them to be stored, filled and transported without instances of caking occurring.

PRIOR ART

Menthol, as a base substance for solid cosmetic or pharmaceutical coolants, is a naturally occurring active ingredient which produces a cooling effect on contact with mucous membranes, especially the oral mucosa. Menthol—and numerous subsequently developed menthol compounds with a cooling effect enhanced, in some cases significantly—therefore find broad application in pharmacy, cosmetology, and the food-and-drink industry. In natural sources, peppermint oil being one example, menthol occurs in the form of four diastereomeric enantiomer pairs, of which only the main component, (−)-menthol or L-menthol, has the desired gustatory and other sensory properties, as described as early as in J. Am. Chem. Soc., Vol. 39 (8), 1917, pp. 1515 to 1525. Thus, in particular, the melting points of these different modifications are between 33 to 43° C. as described in Arzhiv der Phazrmzie, 307 (7), 1974, pp. 497 to 503. The melting point of the stable α-modification, accordingly, is 42 to 43° C.

Because of this position of the melting points, L-menthol and also the majority of menthol compounds can be delivered to the end consumer not only as a melt maintained in liquid form in heated containers, but also in the form of crystals or other solidified shapes, such as compacts, pellets, flakes and the like. Generally speaking, all solids which, like L-menthol and the compounds structurally related to menthol, have a melting point of only just above the ambient air temperature, exhibit a strong propensity to undergo caking and form lumps. The processing of such material, which is not in accordance with specification, entails considerable extra cost and complexity, however. If, then, pure L-menthol and/or menthol compounds, in other words not material which has been treated with auxiliaries such as release agents, for example, are to be sold in solid form, it is necessary to ensure, either by means of a continuous cooling chain or through the nature of the shaping, that the product reaches the end consumer in free-flowing form.

Commercially, for example, menthol is available in the form of large crystals, with a thickness of 1 to 3 mm for a length of 0.5 to 3 cm. These crystals are traditionally grown in small amounts of naturally obtained peppermint oil, with the oil being induced to crystallize in troughs or tubs over many days in cooling houses. These crystals exhibit good free-flowability only when the bed height is small, but undergo caking increasingly under increased load and/or at elevated temperature. The technical cost and complexity entailed in the crystallization, isolation and purification of the crystals, and the low space-time yield of such a laborious process, render it unattractive for large-scale industrial application.

DE 2530481 relates to an apparatus for crystallizing substances, especially optically active menthol compounds, which under crystallization conditions form coarse acicular and beam-shaped crystals. The crystallization process, to be conducted discontinuously, is carried out using a particular stirring mechanism which prevents the crystals caking in the crystal suspension. The product of value is lastly isolated by a centrifuge and dried in a dryer.

The two U.S. Pat. Nos. 3,023,253 and 3,064,311 describe flaked L-menthol and also a method for producing such flakes by applying a melt of L-menthol to a chilled immersion roll. If desired, the menthol melt may be introduced between a pair of counter-rotating chilled rolls. The film of menthol formed by crystallization on the immersion roll is aftertreated by introduction of heat to heat it and by application of additional menthol to reinforce it. Both aftertreatments are achieved simultaneously with an application roll. The flakes thus obtained initially have good free-flowability. After prolonged storage, however, slight caking occurs, and necessitates mechanical loosening by shaking of the container. It is noted that this caking is caused by a porous surface which, though mentioned, is not characterized in any more detail, and by consequent severe sublimation of the product, and that the product thus obtained can be further processed by being compacted to form pellets.

The principle of further coarsening of the primary particles by compacting is also described in DE 10224087, relating to compacted menthol in the form of menthol compacts, and also to a method for producing such compacts. Here, however, the emphasis is not on the effect of the particle size alone but on the need for the primary particles to be present in a specific crystal modification. Through compression of crystals which have been obtained from solution crystallization or from chilled-roll flaking, it is possible to obtain compacts with stability toward caking if these compacts consist predominantly of the thermodynamically stable α-modification which melts only at 42.5° C.

Subject-matter of international patent application WO 2008/152009 A1 (BASF) is a process for preparing L-menthol in solid form by contacting an L-menthol melt with two mutually spaced chilled surfaces, with solidification of the L-menthol melt to form L-menthol in solid form, the contact between the solidifying L-menthol melt and the chilled surfaces being maintained at least until the end of solidification. In this process, the crystallization of the menthol is brought about by a combination of a precrystallizer and a double-belt cooler. The menthol suspension in this system is introduced into the gap between two chilled surfaces and is induced to solidify or crystallize.

A particular problem associated with the packaging, storage and transport of solid coolants of the type described in general, and of menthol in particular, is the high fine fraction, which causes the compacts to undergo caking, and also the high sublimation tendency of these substances. As a result, the solids are often packaged in plastic pouches and the packages are subsequently handled deliberately roughly so that caked solids are disrupted again mechanically.

A particular disadvantage is that because of their sublimation tendency, the products are in some cases even classed as hazardous material and in that case can no longer be packaged in any desired way. In such cases, in fact, there are only certain forms of cardboard packaging that are suitable, those possessing approval for the transport of hazardous goods. It will be understood that this leads to a further increase in the expense of the products, something which should be prevented.

The problem addressed by the present invention was therefore that of indicating a way of allowing solid coolants, especially solid menthol compounds, and more particularly menthol and menthol racemates, to be provided in such a way that they can be stored and transported in conventional packages without the described instances of caking occurring.

DESCRIPTION OF THE INVENTION

The invention provides a method for caking-free storage of solid coolants which is distinguished by the fact that they are dispensed into standard packages having a capacity of not more than 25 l, with the provisos that
(a) the packages are filled to an extent of not more than 50 vol %, and
(b) the filling quantity does not exceed a weight of 10 kg.

Surprisingly it has been found that solid coolants, preferably menthol compounds and more preferably menthol and its racemates, can be dispensed, stored and transported readily in any desired standard packaging, especially standard cartons, if particular packaging protocols are observed for this purpose, namely that the packages are filled not more than halfway, specifically up to halfway in terms of the height of the packages, and the filling quantity ought in total not to exceed a weight of about 10 kg and more particularly about 5 kg. In this simple but effective way, even menthol racemates can be stored without problems over a period of at least six weeks at ambient temperature without any need for mechanical aftertreatment. In actual fact, indeed, packaging in plastic pouches, which has been customary to date, is now unnecessary—in other words, even menthol can be filled directly into the standard packaging, something which was hitherto considered not to be possible.

BRIEF DESCRIPTION OF THE DRAWINGS

The present invention will be described in greater detail with reference to the accompanying drawings in which
FIG. 1 schematically illustrates the experimental procedure of the present invention.

COOLANTS

Figure 1:
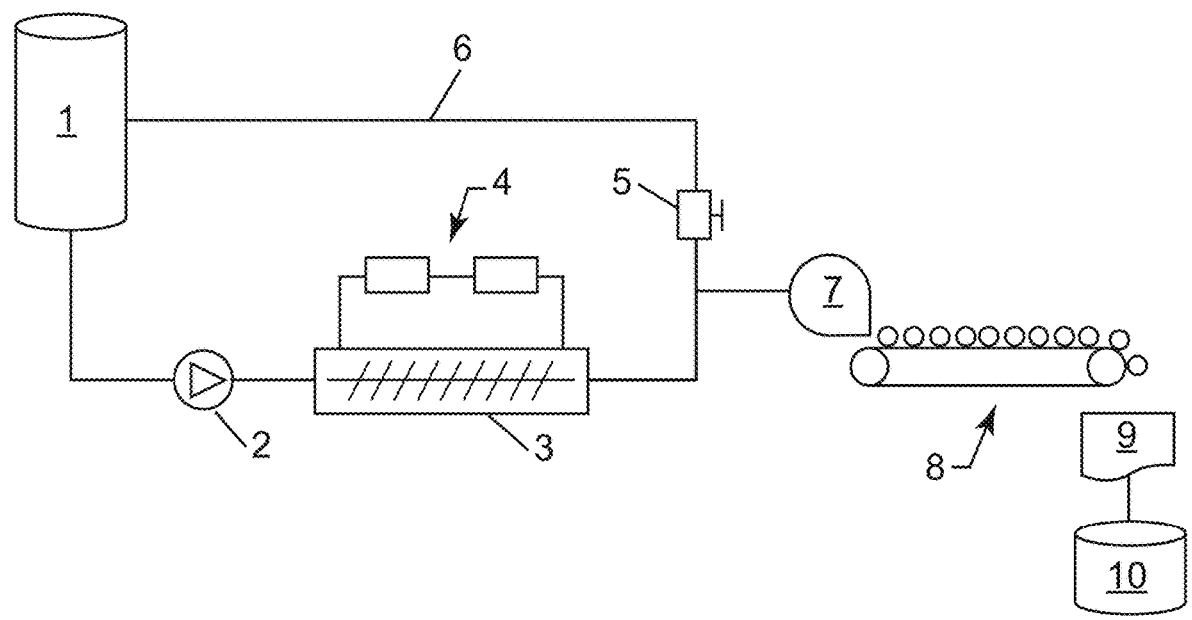

Coolants in general and menthol compounds as a preferred embodiment in particular encompass—as well as the parent compound, menthol itself—substances selected from the group consisting of menthol methyl ether, menthone glyceryl acetal (FEMA GRAS[1] 3807), menthone glyceryl ketal (FEMA GRAS 3808), menthyl lactate (FEMA GRAS 3748), menthol ethylene glycol carbonate (FEMA GRAS 3805), menthol propylene glycol carbonate (FEMA GRAS 3806), menthyl N-ethyloxamate, monomethyl succinate (FEMA GRAS 3810), monomenthyl glutamate (FEMA GRAS 4006), menthoxy-1,2-propanediol (FEMA GRAS 3784), menthoxy-2-methyl-1,2-propanediol (FEMA GRAS 3849) and also the menthanecarboxylic esters and menthanecarboxamides WS-3, WS-4, WS-5, WS-12, WS-14 and WS-30 and also mixtures thereof.

[1] FEMA stands for "Flavor and Extracts Manufacturers Association" and GRAS is defined as "generally regarded as safe". A FEMA GRAS designation means that the substance thus identified is tested by standard methodology and deemed toxicologically unobjectionable.

A first important representative of the substances which form component (b) is monomenthyl succinate (FEMA GRAS 3810), which was patented as a compound as early as 1963 by Brown & Williamson Tobacco Corp. (U.S. Pat. No. 3,111,127) and which as a cooling agent is subject-matter of property rights U.S. Pat. Nos. 5,725,865 and 5,843,466 (V. Mane Fils). Both the succinate and the analogous monomenthyl glutarate (FEMA GRAS 4006) are important representatives of monomenthyl esters based on dicarboxylic and polycarboxylic acids:

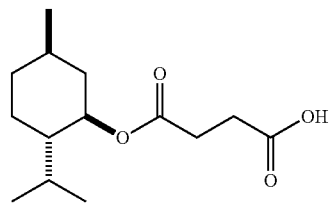

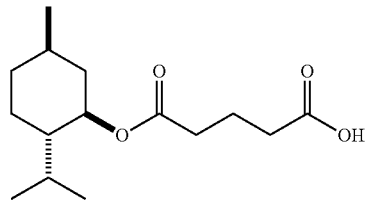

Examples of applications of these substances are found, for example, in publications WO 2003 043431 (Unilever) or EP 1332772 A1 (IFF).

The next important group of menthol compounds preferred for the purposes of the invention encompasses carbonate esters of menthol and polyols, such as, for example, glycols, glycerol or carbohydrates, such as, for example, menthol ethylene glycol carbonate (FEMA GRAS 3805=Frescolat® MGC), menthol propylene glycol carbonate (FEMA GRAS 3784=Frescolat® MPC), menthol 2-methyl-1,2-propanediol carbonate (FEMA GRAS 3849) or the corresponding sugar derivatives:

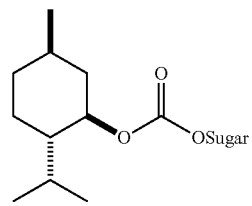

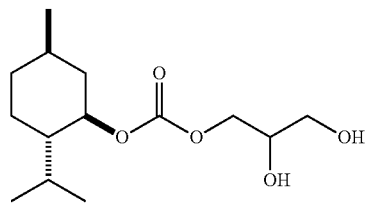

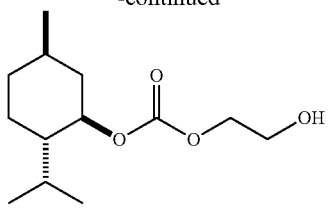

Menthol ethylene glycol carbonate

The use of such substances as coolant for cigarettes is subject-matter, for example, of publication U.S. Pat. No. 3,419,543 (Mold et al.) from 1968; use as a physiological cooling agent is claimed in DE 4226043 A1 (H&R).

Preferred for the purposes of the invention are the menthol compounds menthyl lactate (FEMA GRAS 3748=Frescolat® ML) and particularly menthone glyceryl acetal (FEMA GRAS 3807) or menthone glyceryl ketal (FEMA GRAS 3808), which is marketed under the name Frescolat® MGA.

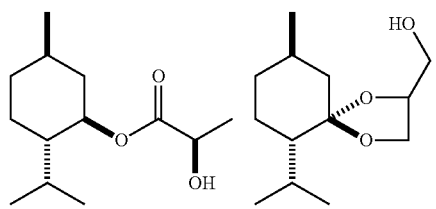

The former structure is obtained by esterification of lactic acid with methanol, the latter by acetalization of menthone with glycerol (cf. DI 2608226 A1, H&R). This group of compounds also includes 3-(1-menthoxy)-1,2-propanediol, also known as Cooling Agent 10 (FEMA GRAS 3784, cf. U.S. Pat. No. 6,328,982, TIC), and also 3-(1-menthoxy)-2-methyl-1,2-propanediol (FEMA GRAS 3849), which possesses an additional methyl group.

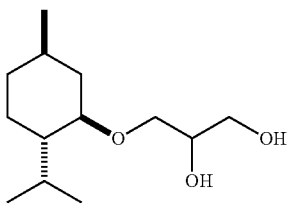

Cooling Agent 10

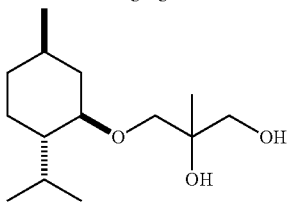

1-Menthoxy-2-methyl-1,2-propanediol

The 3-(1-menthoxy)-1,2-propanediol is prepared, for example, starting from menthol by the following scheme (cf. U.S. Pat. No. 4,459,425, Takagaso):

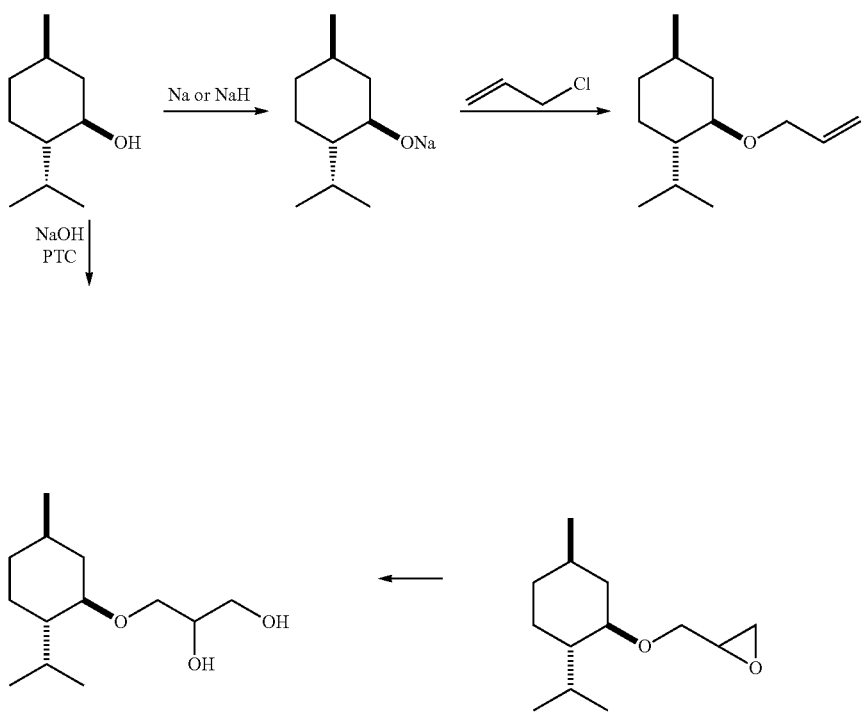

Alternative routes in which menthol is reacted with epichlorohydrin in the first stage are described in U.S. Pat. Nos. 6,407,293 and 6,515,188 (Takagaso). Below is an overview of the preferred menthol compounds, which are distinguished by a CO bond:

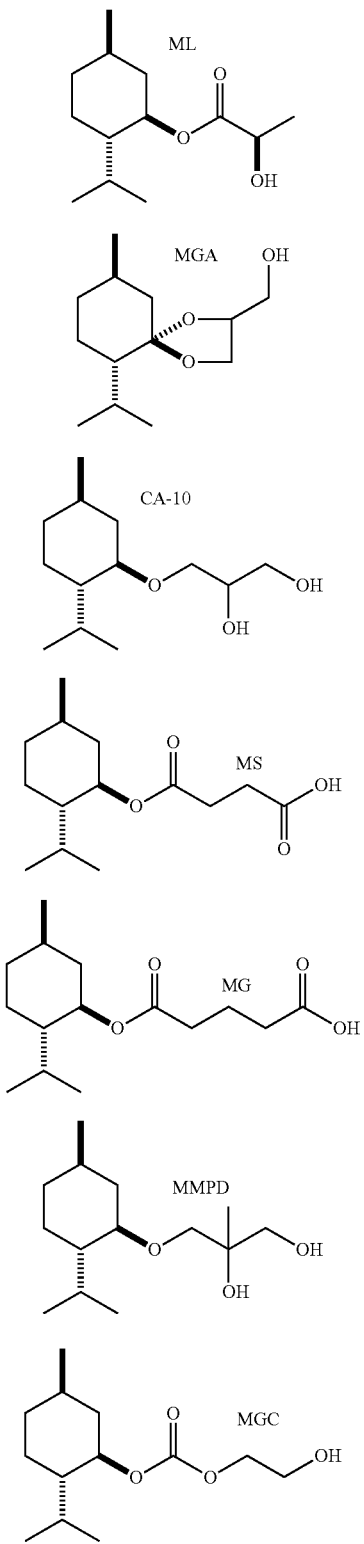

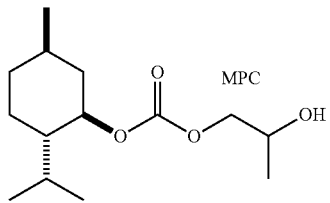

Having proven especially advantageous among these substances are menthone glyceryl acetal/ketal and also menthyl lactate and also menthol ethylene glycol carbonate and/or menthol propylene glycol carbonate, which the applicant sells under the names Frescolat® MGA, Frescolat® ML, Frescolat® MGC, and Frescolat® MPC.

In the 70s decade of the preceding century, for the first time, menthol compounds were developed which possess a C—C bond in position 3 and of which likewise a series of representatives may be used for the purposes of the invention. These substances are designated generally as WS products. The parent structure is a menthol derivative in which the hydroxyl group has been replaced by a carboxyl group (WS-1). This is the structure from which all other WS products derive, such as, for example, the species WS-3, WS-4, WS-5, WS-12, WS-14 and WS-30, which are likewise preferred for the purposes of the invention. The two schematics below show the synthesis pathways:

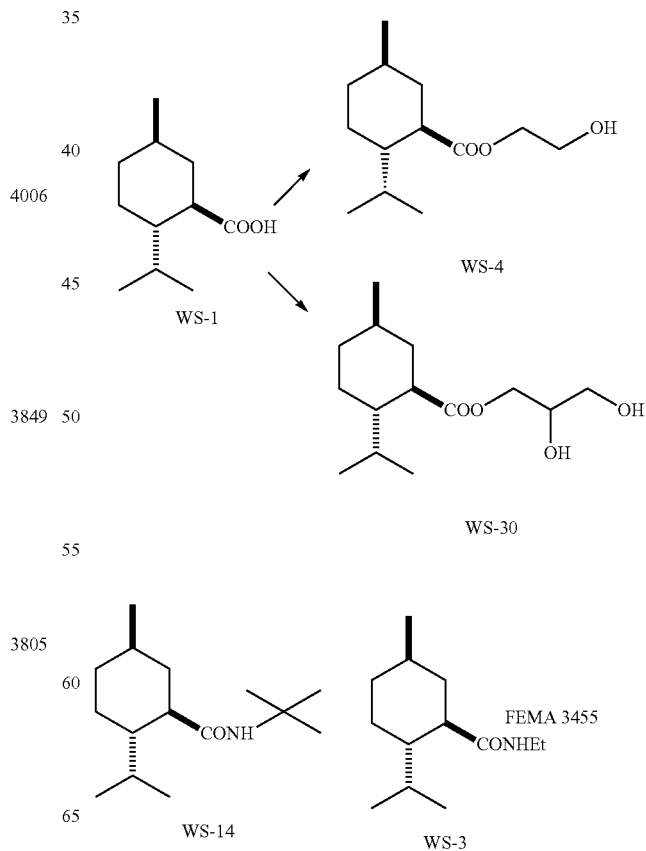

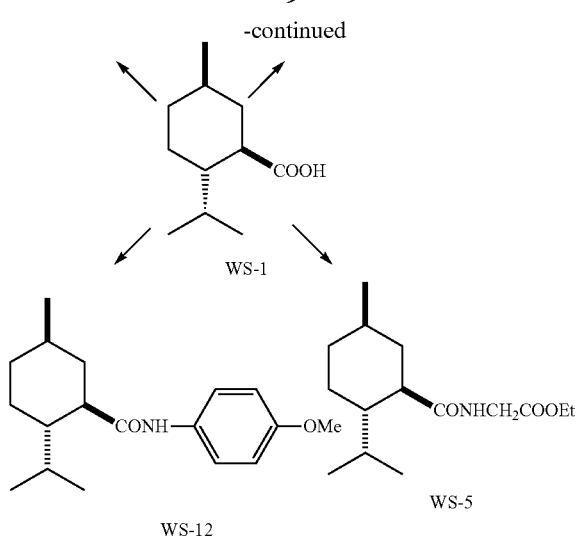

The esters which derive from WS-1 are described for example in U.S. Pat. No. 4,157,384, the corresponding N-substituted amides in J. Soc. Cost. Chem. pp. 185-200 (1978).

A series of the above-described coolants are not solid at room temperature, but instead liquid. As is immediately clear to the skilled person, however, these substances can be blended, in accordance with the claim, with other coolants which are solid at room temperature, these mixtures themselves being solid again.

Menthol Compounds

Menthol compounds for storage in accordance with the invention are, in particular, solidified melts of L-menthol, it being possible for the melted menthol to be natural or synthetic in origin, and having an enantiomeric excess of customarily at least 95, 96 or 97 to 100%, preferably 98, 98.5 or 99 to 99.9%. Also especially suitable as starting materials for the purposes of the method of the invention are those L-menthol melts which have an L-menthol content of at least 95, 96 or 97 wt % or more, preferably at least 98 to 100 wt % and very preferably 98, 98.5 or 99 to 99.9 wt % (based in each case on the total weight of the melt), in addition to impurities such as, for example, residues of solvents, diastereomers of L-menthol, or byproducts from synthesis and/or isolation processes.

The term "L-menthol melt" refers preferably to L-menthol which is present largely, in other words to an extent of at least 80 or more preferably 85 wt %, preferably at least 90 or 95 wt % and very preferably at least 95, 96, 97, 98 or 99 wt % in melted form, the remaining weight fractions being accounted for by the amount of solid L-menthol in the melt. The fraction of solid menthol in the melt, when present, may be solid menthol which is still present in the melt as a result of an as yet uncompleted melting operation on the material used for providing the melt, or which is added in solid form—in the form of crystals of L-menthol in the α-modification, for example—to the fully or partially melted menthol. Such crystals of L-menthol in the α-modification, also termed seed crystals, may be recovered conventionally, for example, by crystallization of L-menthol from an L-menthol-containing solution or melt.

As already explained at the outset, the problem of caking comes about especially with menthol compounds and more particularly with menthol. In the course of the investigations carried out, the applicant has found that there are further physical parameters which may positively or negatively influence the caking behavior.

Features of solid coolants in general, menthol compounds and especially menthol in particular, which have an already fundamentally reduced propensity toward caking, are that they contain only small fine fractions, have a favorable surface/volume ratio, and at the same time possess domed but smooth surfaces, which result, in the bed, in very small contact areas, and are insensitive to abrasion and, moreover, have very few fracture edges or none.

Specifically preferred, therefore, are solid coolants, above all L-menthol particles and/or menthol racemate particles, in flake or pellet form, for example, having a domed side and a flat side, which have a diameter of about 1 to about 20 mm, preferably 5 to 12 mm, and are further distinguished in that they (i) have a fine fraction (i.e., a fraction of particles having an average diameter of less than 1.6 mm) of less than 5 wt %, preferably less than 2 wt % and in particular less than 1 wt %, very preferably less than 0.5 wt %, more preferably less than 0.1 wt %, and/or (ii) possess an alpha-menthol content of at least 80 wt %, preferably about 85 to about 99 wt %, and in particular about 90 to about 95 wt %, and/or (iii) have a surface-to-volume ratio of less than 2 l/mm, preferably less than 1.5 l/m and more preferably less than 1.0 l/mm, and/or (iv) have domed surfaces, so that the ratio of planar surface area to the total surface area of the particle is not more than 60%, preferably less than 50% and more preferably less than 40%.

In a further preferred embodiment, crystals of L-menthol in the α-modification are used which are obtained by treatment of L-menthol melts in a scraped cooler, the seed crystals being formed in situ in the L-menthol melt under solidification, with avoidance of an additional step of labor.

Further preferred are those particles obtained by dripping a prescraped melt of a menthol compound uniformly onto a chilled surface. The dripping is accomplished preferably by a device called a rotoformer; the chilled surface is preferably a chilled (steel) belt.

In order to maximize solidification of the melts, preferably of the L-menthol in the α-modification, the melt is admixed with seed crystals before being introduced into the rotoformer and applied to the chilling belt as described above. The addition of seed crystals may be achieved, for example, by means of stirred introduction into a reservoir vessel or by scattering of precomminuted crystals in the α-modification of L-menthol, for example, to an L-menthol melt that is used (the liquid crystal film). An alternative option is to scatter α-menthol crystals onto the chilling belt. In one preferred embodiment of the invention, seeding is achieved by passage of the melt through a heat exchanger which is operated below the melting point, and whose walls are freed from crystallized material by an abrading element. Arrangements of this kind are familiar to the skilled person in the form of "scraped coolers", for example, and are described for example in G. Arkenbout: "Melt Crystallization Technology", Technomic Publishing Co. 1995, p. 230. In one preferred embodiment of the method of the invention, accordingly, the seed crystals are formed by treatment in a scraped cooler of the melts that are to be used.

Employed with preference is a prescraped melt of menthol compounds which has a temperature in the range from about 40 to about 60° C. and more particularly about 43 to 50° C. and/or which contains about 0.1 to 12 wt %, more particularly about 1 to about 5 wt %, of seed crystals.

Particularly preferred is the use of a prescraped melt which contains about 0.1 to 12 wt % of seed crystals of L-menthol. Menthol melts supercooled at temperatures of 42 to 43° C. may also be used. In order to prevent the formation within the scraped cooler of adhesions, which then flake off in an uncontrolled way and influence the melting temperature, it is advisable to equip the cooler for example with a trace heater.

In one preferred embodiment, the uniform dripping takes place by means of what is called a rotoformer. The rotoformer consists of a heated cylindrical interior body, which is charged with liquid product, and an outer tube provided with numerous holes, this tube rotating concentrically around the interior body and, in so doing, depositing drops of product over the entire length of a steel belt cooler. A system of baffles and nozzles installed in the interior body ensures uniform pressure over the entire width of the component and hence a uniform emergence of the product through all of the holes in the outer tube. All products here, especially the pellets obtainable in this way, have a uniform size from one side of the steel belt to the other. The peripheral speed of the rotoformer is preferably synchronous with the speed of the belt: the drops are therefore deposited without undergoing deformation. The heat that is released during solidification and cooling is passed by the stainless steel belt to the cooling water which is sprayed against the underside of the belt. The water is collected in vats and is passed to the cool-down unit; at no stage does it come into contact with the product. After the drops have been deposited on the steel belt, a small amount of product remains adhering to the outer edges of the holes in the outer tube. A heatable guide forces this product into an inner gap in the rotoformer, from where it is mixed with the original product and applied again to the steel belt. In order to prevent clogging of the rotoformer, it is advisable here, for example, to use a heat accumulation hood. Corresponding combinations of rotoformer and steel belt cooler are available commercially for example from Sandvik Process Systems GmbH, D-70736 Fellbach. A very similar technology is offered, for example, under the Rollomat name by Kaiser Process & Belt Technology GmbH, D-47800 Krefeld. Also suitable in principle are rotating and vibrating perforated plates, provided the viscosity (corresponding to the solids fraction in the melt) of the melt droplets is not too high.

The melt droplets are preferably deposited by the rotoformer onto a chilled belt, more particularly a chilled steel belt, which may have a plurality of chilling zones, which can be temperature-conditioned independently of one another, to temperatures, for example, below the melting or solidification point—for L-menthol, in the range from about 5 to about 42° C. Typical, for example, are chilling belts having three chilling zones, of which the first two have temperatures of about 25 to 30° C. and the last of about 15 to 20° C. Chilling belts are employed, for example, which have a length of about 2 to about 20 m and a width of about 10 to about 200 cm. The running speed of the chilling belts is in that case advantageously adjusted in such a way that, taking account of the aforementioned geometry of the belts, the cooling time observed in this way ensures complete crystallization of the melts. Depending on the desired capacity, it is of course also possible to use larger units, with the capacity being proportional to the width of the chilling belt and with the length and speed of the chilling belt determining the residence time. The method may in principle also be carried out on lines which have a capacity of 50 to 1000 kg/h or more.

The solid coolants are subsequently taken from the belt, with the aid of a knife, for example. Take-off may be carried out either after the single cooling length or with assistance, after a further spell on the chilling belt, at near the point of application. For aging, the material may also remain for longer on the belt and may remain in a lower-temperature or further temperature-conditioned region.

Instead of a chilling belt it is also possible to use cooling plates or the like, as sold in the form of pelletizing aids, for example, by Andritz Gouda, NL-2740 Waddingxveen.

Features of the particles obtained by the process outlined are that they contain only small fine fractions, have a favorable surface/volume ratio, and at the same time possess domed but smooth surfaces, which result, in the bed, in very small contact areas, and are insensitive to abrasion and, moreover, have very few fracture edges or none.

The particular modification of the resulting solidified L-menthol that is present, and hence the end of the solidification process, may be determined by methods known to the skilled person, such as x-ray diffraction or powder diffractometry (see, for example, Joel Bernstein, "Polymorphism in Molecular Crystals", Oxford University Press 2002, pp. 94-150).

Standard Packaging

For the purposes of the present invention, standard packaging storage, including the filling and the subsequent transport, of the solid coolants comprehends preferably what are called standard cartons, which in particular require no hazardous product classification. These standard cartons may be single-wall, double-wall or triple-wall; preferably they are single-wall. They customarily possess lid flaps and bases which abut one another, and they have a volume of about 10 to about 25 and more particularly about 20 to about 24 liters. It is likewise customary for these cartons to consist of corrugated card, preferably of corrugated card of grade 1.30 c according to WK-10, while possessing an edge crush resistance (ECT value) of about 4 to about 7 kN/m and more particularly about 4.5 to about 6.0 kN/m. Typical bursting values for such cartons are in the range from about 900 to about 1000 kPa.

For the purposes of the present invention, standard cartons of type N7 with dimensions (height×length×width) of about 400×300×200 mm are particularly preferred.

Figure 7:
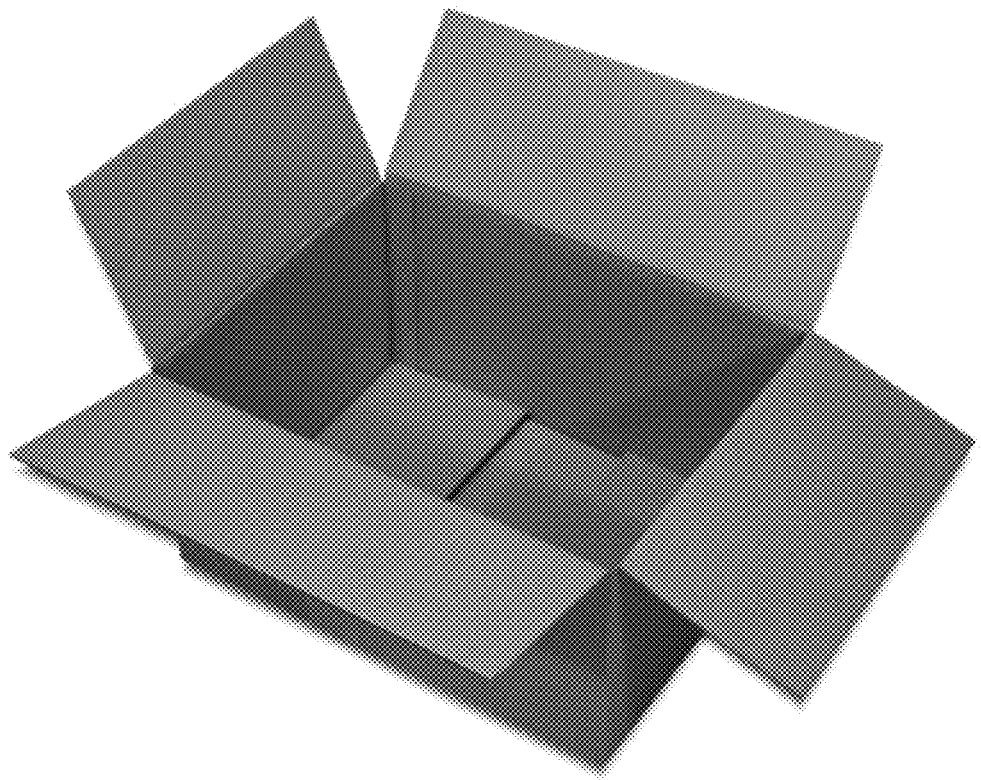
FIG. 7 illustrates a sample carton used in the present invention.

This is a transport package which is fabricated in accordance with FEFCO 0201 with mutually abutting lid flaps and base flaps, satisfying the mandates of the majority of major European trading houses. The standard cartons are produced from mixed-source papers and are particularly inexpensive. Another advantage of the N7 cartons is that they can be stacked without loss of space both on Europallets and on US pallets. A sample is reproduced in FIG. 7. Corresponding products can be obtained, for example, from Friedrich Bähr GmbH & Co. KG, 28279 Bremen (DE).

A last subject of the invention relates, finally, to standard packages having a capacity of not more than 25 l, containing solid active cooling ingredients, with the proviso that (a) the packages are filled to an extent of not more than 50 vol %, and (b) the filling quantity does not exceed a weight of 10 kg.

EXAMPLES

Production Examples

In the working examples below, the intention was to produce and investigate pellets having an optimum surface-to-volume ratio and good caking properties. The intention was likewise to determine process conditions ensuring the production of completely through-crystallized material. Subsequent crystallization in the packaged state ought to be prevented.

Experimental Setup and Process Procedure

The experiments were conducted on a steel belt cooler with rotoformer and upstream scraped cooler as shown diagrammatically in FIG. 1. The reference symbols here have the following meanings:

| | |
|---|---|
| 1 | Reactant container |
| 2 | Reactant pump |
| 3 | Extruder |
| 4 | Heat exchanger |
| 5 | Valve |
| 6 | Reactant return |
| 7 | Rotoformer |
| 8 | Chilling belt with three chilling zones T1, T2, T3 |
| 9 | Granulator |
| 10 | Product receiver |

A melt prescraped in the scraped cooler (i.e. a suspension of seed crystals in menthol) was applied via a rotoformer to a precooled steel belt. The chilling belt length was 12.5 m, the belt width 600 mm. The chilling belt had three chilling zones, which could be temperature-controlled independently of one another. Removal from the chilling belt took place by means of a knife, either after the single cooling length or, with the aid of the belt return, close to the site of application. As a result, the material underwent additional cooling over the 12.5 m of the belt return. The running speed of the chilling belt (and hence the capacity of the chilling belt) was not substantially modified during the experiments, with the resulting throughput across experiments being in the range of 150-165 kg/h. The material obtained was separated from adhering fine fractions using a shaker screen machine (from Allgaier; screen size: 1.6 mm and 1.25 mm). The unload temperature of the material was determined by measurement in a Dewar vessel with thermocouple. The change in temperature after removal from the belt is referred to hereinafter as heat of subsequent crystallization. The throughput was determined using a stopwatch and a balance in the middle part of an experimental run. For each experiment, about 20 to 30 kg of pellets were taken as an initial fraction. During the experiment, the materials obtained were packed into F1 cartons with an internal PE bag (standard packaging for compacted menthol at Symrise).

Example 1

The starting temperature selected was 30° C. on T1 and T2, since this temperature of the metal belt is close to the solidification temperature of the α-modification (see diagram 1) and only a little γ-modification was expected in the case of a superimposed spontaneous crystallization. The solidification temperature in the pellet ought to be higher, as a result of the poorer transit of heat through the solidified menthol, and therefore ought to lead preferentially to the formation of α-modification. On T3, 15° C. was selected, in order to force heat transport through the already solidified menthol and so to ensure complete crystallization. The experimental conditions are reproduced in table 1.

TABLE 1

| Experimental conditions | |
|---|---|
| Temperature zones of chilling belt | T1: 30° C.; T2: 30° C.; T3: 15° C. |
| Temperature of scraped cooler | 41.5° C. |
| Throughput | 150 kg/h |
| Weights (cartons) | 15.6 kg/12.45 kg/19.50 kg/21.05 kg/20.6 kg |
| Fine fractions | 41.8 g in 89.2 kg (469 g/t pellets) |
| Unload temperature | 25.2° C. |
| Heat of subsequent crystallization | 1° C. over 1 h room temperature: 27° C. |

Figure 2:
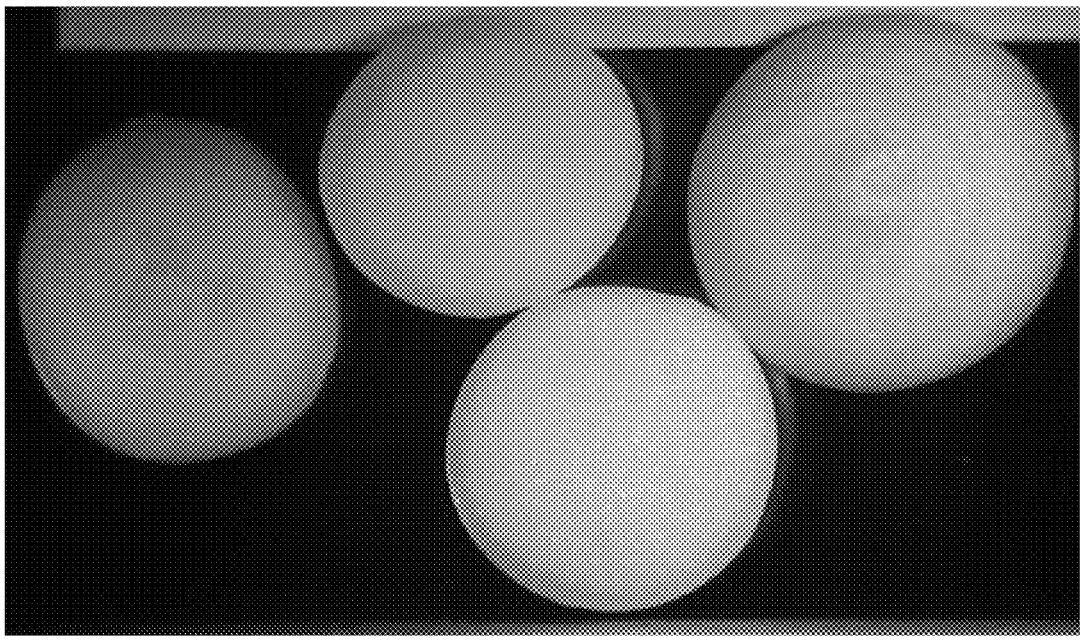
FIG. 2 illustrates coolant pellets prepared according to Example 1 in the present application.

After a short initial reaction, purely white pellets were obtained (FIG. 2). The pellets were completely through-crystallized and were separable by spatula/knife only with difficulty.

Example 2

Figure 3:
FIG. 3 illustrates coolant pellets prepared according to Example 2 in the present application.

After passage on the chilling belt, the pellets at T2 were still not fully through-crystallized. At the end of the chilling belt at T3, the pellets were still slightly soft at the upper end and were easily separable by knife. The experimental conditions are reproduced in table 2; the pellets can be seen in FIG. 3.

TABLE 2

| Experimental conditions | |
|---|---|
| Temperature zones of chilling belt | T1: 30° C.; T2: 30° C.; T3: 18° C. |
| Temperature of scraped cooler | 41.4-41.6° C. |
| Throughput | 165 kg/h |
| Weights (cartons) | 19.82 kg/20.48 kg/20.93 kg/20.27 kg |
| Fine fractions | 106.4 g in 81.5 kg (1305 g/t pellets) |
| Unload temperature | 24.4° C. |
| Heat of subsequent crystallization | 1° C. over 30 min room temperature: 27° C. |

Example 3

Figure 4:
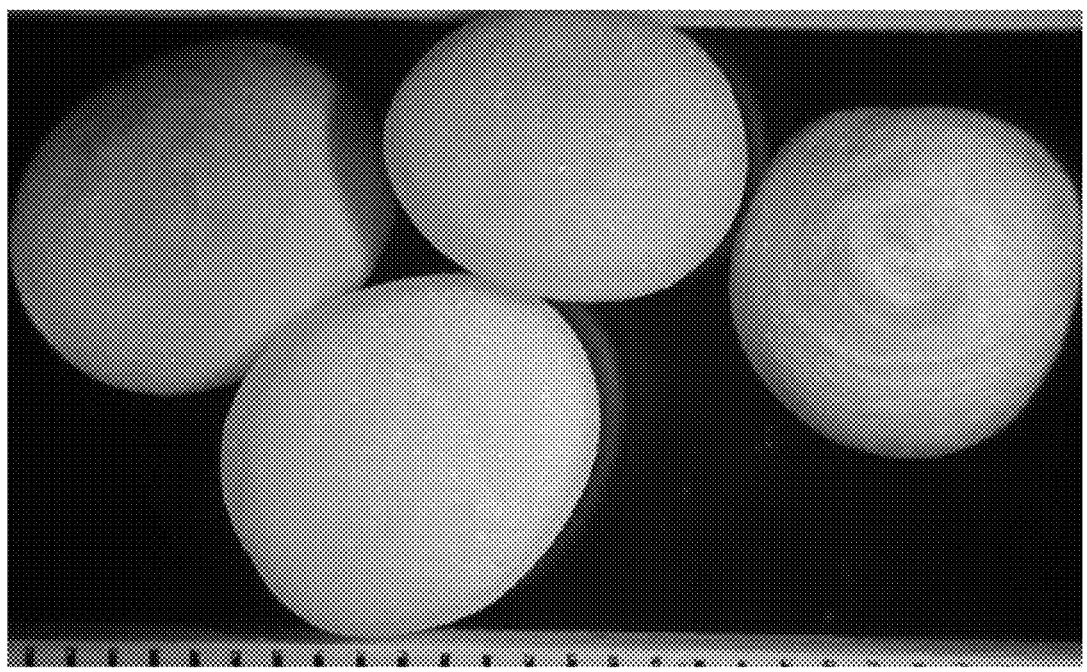
FIG. 4 illustrates coolant pellets prepared according to Example 3 in the present application.

In the course of experiment 3, the take-off knife at the end of the chilling belt was removed. The belt return was used as an additional aftercooling section. The pellets, after removal, were hard and through-crystallized. The experimental conditions are reproduced in table 3; the pellets can be seen in FIG. 4.

TABLE 3

| Experimental conditions | |
|---|---|
| Temperature zones of chilling belt | T1: 30° C.; T2: 30° C.; T3: 18° C.; belt return aftercooling |
| Temperature of scraped cooler | 41.4-41.6° C. |
| Throughput | 165 kg/h |
| Weights (cartons) | 20.57 kg/20.49 kg/19.36 kg |
| Fine fractions | 48.6 g in 60.42 kg (804 g/t pellets) |
| Unload temperature | 24.4° C. |
| Heat of subsequent crystallization | 1° C. over 30 min room temperature: 27° C. |

Example 4

Figure 5:
FIG. 5 illustrates coolant pellets prepared according to Example 4 in the present application.

The pellets were comparable to example 1. The experimental conditions are reproduced in table 4; the pellets can be seen in FIG. 5.

TABLE 4

Experimental conditions

| | |
|---|---|
| Temperature zones of chilling belt | T1: 30° C.; T2: 30° C.; T3: 15° C. |
| Temperature of scraped cooler | 41.5-41.6° C. |
| Throughput | 150 kg/h |
| Weights (cartons) | 18.85 kg/18.75 kg/19.45 kg/19.65 kg |
| Fine fractions | 106.1 g in 76.7 kg (1383 g/t pellets) |
| Unload temperature | 25.2° C. |
| Heat of subsequent crystallization | 1.0° C. over 30 min room temperature: 28° C. |

Example 5

Figure 6:
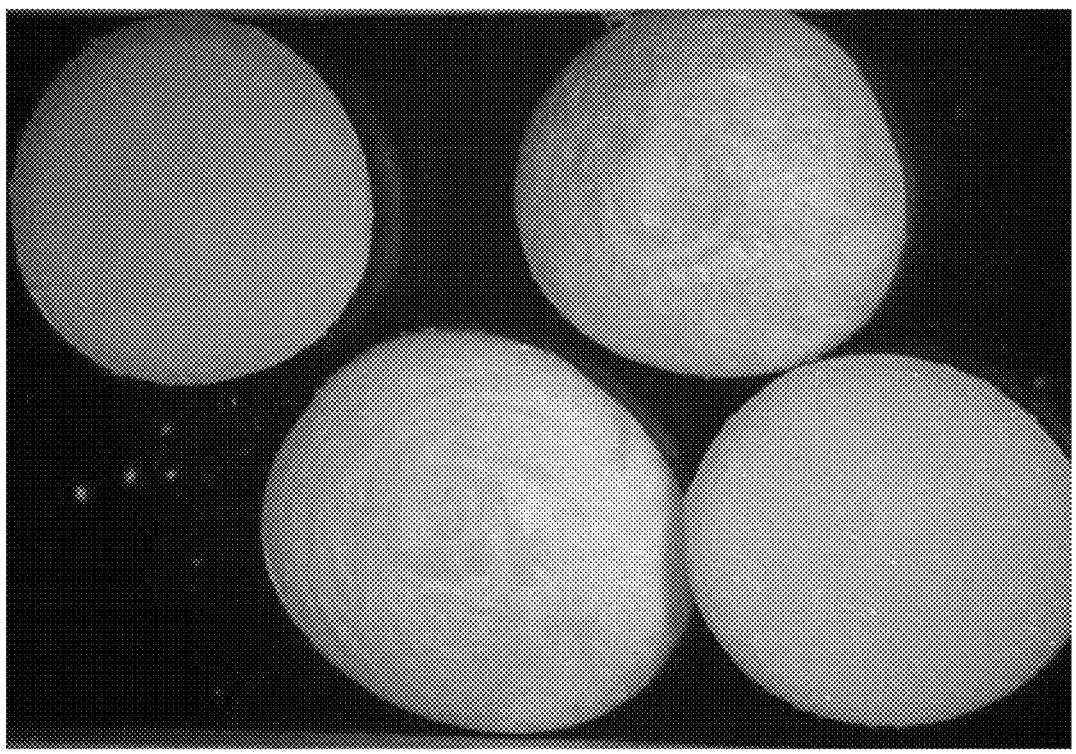
FIG. 6 illustrates coolant pellets prepared according to Example 5 in the present application.

In the course of example 5, the take-off knife at the end of the chilling belt was removed. The belt return was used as an additional aftercooling section. The pellets, after removal, were hard and through-crystallized. The experimental conditions are reproduced in table 5; the pellets can be seen in FIG. 6.

TABLE 5

Experimental conditions

| | |
|---|---|
| Temperature zones of chilling belt | T1: 30° C.; T2: 30° C.; T3: 15° C.; belt return aftercooling |
| Temperature of scraped cooler | 41.4-41.6° C. |
| Throughput | 165 kg/h |
| Weights (cartons) | 15.4 kg |
| Unload temperature | 22.2° C. |
| Heat of subsequent crystallization | 1.0° C. over 30 min room temperature: 28° C. |

Example 6, Comparative Example C1

Example 1 was repeated, but cooling was carried out by means of a double-belt cooler with chilled steel surfaces and a gap width of 0.3 cm (length 12 m, width 35 cm). The double-belt cooler likewise had three chilling zones (30° C., 30° C., 15° C.); the product was taken off in the form of flakes by means of a knife.

5 kg of each of the pellets according to inventive example 1 (diameter: 5 mm) and to comparative example C1 were filled into plastic bags, which were stored in cartons over a period of 6 weeks at 20° C. The results are summarized in table 6.

TABLE 6

Storage tests

| Storage time | Example 1 | Comparative example C1 |
|---|---|---|
| 1 week | Material easily separable at the surface. No lumping. | Material easily separable at the surface. No lumping. |
| 2 weeks | Material easily separable at the surface. In the middle of the contents, a small amount has caked together to form lumps, which can be separated by hand. | Material separable at the surface. In the middle of the contents, lumps have formed which can be separated with a scoop. |

TABLE 6-continued

Storage tests

| Storage time | Example 1 | Comparative example C1 |
|---|---|---|
| 3 weeks | Material easily separable at the surface. In the middle of the contents, a small amount has caked together to form lumps, which can be separated by hand. | Material separable at the surface. In the middle of the contents, significant lumps have formed which can be separated with a scoop. |
| 4 weeks | Material easily separable at the surface. In the middle of the contents, a small amount has caked together to form lumps, which can be separated by hand. | Material separable at the surface. In the middle of the contents, significant lumps have formed which can be separated with a scoop. |
| 5 weeks | Material separable at the surface. In the middle of the contents, lumps have formed which can be separated with a scoop. | Material separable with difficulty at the surface. In the middle of the contents, significant lumps have formed which can be separated with a scoop. Slight formation of needles at the surface by sublimation. |
| 6 weeks | Material separable at the surface. In the middle of the contents, significant lumps have formed which can be separated with a scoop. Slight formation of needles at the surface by sublimation. | 80% lumping, significant formation of needles as a result of sublimation. |

Example 7

In order to demonstrate that the crystal modification alone is not responsible for the caking tendency, 20 kg of L-menthol stored for 8 months, and entirely in its α-modification, were comminuted to crystal powder on a screen mill with a 3 mm screen-hole insert. No increase in temperature as a result of the comminuting process was measured. The crystal powder was subsequently stored again. After two weeks, the powder had caked to form a block, which could be loosened locally only by vigorous kneading.

The examples show that the solid coolants obtained by the method described possess significantly improved storage properties in comparison to the products of the prior art. In particular, the tendency to caking of the compacts, and also their propensity to sublimation, are significantly reduced. Accordingly it is now possible, in contrast to the previous requirements, to use packaging cartons which do not possess hazardous product classification and are therefore substantially more favorably priced.

The invention claimed is:

1. A method for caking-free storage of solid coolants, comprising the steps of
   (a) dispensing the coolants into cartons having a capacity of not more than 25 l with dimensions (height×length×width) of about 400×300×200 mm,
   (b) filling the cartons to an extent of not more than 50 vol %,
   (c) not exceeding a filling quantity weight of 10 kg in the cartons, and
   (d) storing the thus-filled cartons over a period of at least six weeks at ambient temperature, without any need for mechanical after-treatment of the thus-stored coolants.

2. The method as claimed in claim 1, wherein coolants are selected from the group consisting of menthol including its racemates, menthol methyl ether, menthone glyceryl acetal, menthone glyceryl ketal, menthyl lactate, menthol ethylene glycol carbonate, menthol propylene glycol carbonate, menthyl N-ethyloxamate, monomethyl succinate, monomenthyl glutamate, menthoxy-1,2-propanediol, menthoxy-2-methyl-1,2-propanediol and also the menthanecarboxylic esters and menthanecarboxamides WS-3, WS-4, WS-5, WS-12, WS-14 and WS-30 and mixtures thereof.

3. The method as claimed in claim 1, comprising dispensing menthol compounds as coolants.

4. The method as claimed in claim 3, wherein the menthol compounds are an L-menthol or a menthol racemate.

5. The method as claimed in claim 1, comprising dispensing coolants which possess an α-menthol content of about 85 to about 99 wt %.

6. The method as claimed in claim 1, comprising dispensing the coolants in the form of flakes or pellets.

7. The method as claimed in claim 1, comprising dispensing coolants which have (i) a fine fraction of less than 5 wt %, and/or
(ii) an alpha-menthol content of at least 80 wt %, and/or
(iii) a surface-to-volume ratio of less than 2 l/mm.

8. The method as claimed in claim 1, comprising dispensing coolants which have a fine fraction of less than 2 wt %.

9. The method as claimed in claim 1, comprising dispensing coolants which have a surface-to-volume ratio of less than 1.5 l/mm.

10. The method as claimed in claim 1, comprising dispensing coolants which have domed surfaces, so that the ratio of planar surface area to total surface area of the particle is not more than 60%.

11. The method as claimed in claim 10, wherein the cartons have lid flaps and bases abutting one another.

12. The method as claimed in claim 10, wherein the cartons are constituted by corrugated card of grade 1.30 c according to WK-10.

13. The method as claimed in claim 10, wherein the cartons have an edge crush resistance of about 4 to about 7 kN/m and/or a bursting value of about 900 to about 1000 kPa.

* * * * *